United States Patent [19]

Nelson

[11] Patent Number: 5,568,632
[45] Date of Patent: Oct. 22, 1996

[54] METHOD AND APPARATUS FOR CACHE MEMORY

[75] Inventor: S. Craig Nelson, San Jose, Calif.

[73] Assignee: LSI Logic Corporation, Milpitas, Calif.

[21] Appl. No.: 169,572

[22] Filed: Dec. 17, 1993

[51] Int. Cl.⁶ ...................................................... G06F 12/00
[52] U.S. Cl. ...................... 395/460; 395/486; 364/DIG. 1
[58] Field of Search ...................................... 395/445, 460, 395/461, 463

[56] References Cited

U.S. PATENT DOCUMENTS 4,197,580   4/1980   Chang et al. ............................ 395/460

OTHER PUBLICATIONS

Bolot, J. et al, "Evaluating Caching Schemes for the X.500 Directory system", Distributed Computing Systems, 1993 Intl Conf pp. 112–119.
Belady, L. A., "A study of replacement algorithms for a virtual–storage computer" IBM Systems Journal, vol. 5, No. 2, 1966 pp. 78–101.
Radhavan, P. et al. "Memory vs. Randomization in on–line Algorithms" Proceedings of the 16th International Colloquium on Automata, Languages and Programming, Jul. 89, pp. 687–703.
Alexander, Cedell, et al, "Cache Memory Performance in a Unix Enviroment", Computer Architecture News, v. 14, No. 3, Jun. 1986, pp. 41–70.
Handy, Jim, The cache Memory Book, 1993, Academic Press, pp. 46–61.

Primary Examiner—Rebecca L. Rudolph
Attorney, Agent, or Firm—Katz & Cotton, LLP

[57] ABSTRACT

The present invention is an improved method and apparatus for selecting and replacing a block of a set of cache memory. The present invention provides for the weighted random replacement of blocks of cache memory by assigning indices to the memory blocks of a given set of cache memory. One of the assigned indices is then randomly selected by the present invention. The memory block of the given set to which the randomly selected index is assigned is replaced. The indices are assigned such that one or more blocks of the given set of cache memory have a high probability of replacement, whereas the other blocks of the given set of cache memory have significantly lower probabilities of replacement.

13 Claims, 5 Drawing Sheets

METHOD AND APPARATUS FOR CACHE MEMORY

FIELD OF THE INVENTION

The present invention relates generally to cache memory for computer systems. In particular, the present invention relates to an improved method and apparatus for selecting memory blocks of information that include data and instructions, from a set associative cache memory for replacement when the cache memory is full, but it is necessary to add certain information to the cache memory.

BACKGROUND OF THE INVENTION

Caches; In General

Conventional cache memory systems are well known in the art. A central processing unit ("CPU") reads information, such as data and instructions, from main memory in order to execute a computer program. Main memories are typically implemented with slower, less costly memory devices for the storage of information. Compared to the speed of a typical CPU, the time required to access main memory and to retrieve information needed by the CPU is relatively slow. Valuable time may be lost while the CPU waits on information being fetched from main memory.

Cache memory is used to minimize memory access time in mainframe computers, minicomputers, and microprocessors. A cache memory typically provides a relatively high speed memory interposed between the slower main memory and a CPU to improve effective memory access rates, thus improving the overall performance and processing speed of the CPU by decreasing the apparent amount of time required to fetch information from main memory. High-speed cache memory may thus be used to shorten the effective memory access time.

in common usage, the term "cache" refers to a hiding place. The name "cache memory" is an appropriate term for this high speed memory that is interposed between a CPU and main memory because cache memory is hidden from the user or programmer, and thus appears transparent. Cache memory serves as a buffer between the CPU and main memory, and is not user addressable. The user is only aware of an apparently higher-speed main memory.

Cache memory is generally smaller than main memory because cache memory employs relatively expensive high speed memory devices, such as a static random access memory ("SRAM"). Therefore, cache memory typically will not be large enough to hold all of the information needed during program execution. When cache memory is full, information must be replaced, or "overwritten" with new information from main memory when the new information is necessary for processing. The information in main memory is typically updated each time the CPU changes the information in cache memory (a process called "store-through"). As a result, changes made to information in cache memory will not be lost when new information enters cache memory and overwrites information which may have been changed by the CPU.

Information is only temporarily stored in cache memory during program execution. When information must be retrieved from memory, the system will first determine whether the information is currently stored in cache memory. If so, the information may be quickly retrieved from the relatively high speed cache memory. When the information that is sought to be retrieved is currently located in cache memory, this is commonly referred to as a "cache hit". A cache hit yields a significant savings in program execution time. When the information that is sought to be retrieved is not currently stored in cache memory, a situation commonly referred to as a "cache miss" occurs. A cache miss requires that the desired information be retrieved, in a relatively slow manner, from main memory and then placed in cache memory. Cache memory updating and replacement schemes attempt to maximize the number of cache hits, and to minimize the number of cache misses.

Set Associative Cache Memories

The minimum unit of information that can be either present or not present in a cache memory is referred to as a "memory block". Memory blocks can be placed and retained in cache memory through three distinct organizations. First, a cache memory is said to be "direct mapped" if each block can be placed in only one place in the cache memory. Second, a cache memory is said to be "fully associative" if a block can be placed anywhere in the cache memory. Third, a cache memory is said to be "set associative" if a block can only be placed in a restrictive set of places in the cache memory, namely, in a specified "set" of the cache memory. Computer systems ordinarily utilize a variation of set associative mapping to keep track of the blocks that have been copied from main memory into cache memory.

The hierarchy of a set associative cache memory resembles a matrix. That is, a set associative cache memory is divided into different "sets" (such as the rows of a matrix) and different "columns" (such as the columns of a matrix). Thus, each block of a set associative cache memory is mapped or placed within a given set and within a given column. The number of columns, i.e., the number of blocks in each set, determines the number of "ways" of the cache memory. Thus, a cache memory with four columns (four blocks within each set) is deemed to be "4-way set associative."

Set associative cache memories include addresses for each block in the cache memory. Addresses are divided into three different fields. First, a "block-offset field" is utilized to select the desired information from a block. Second, an "index field" specifies the set of cache memory where a block is mapped. Third, a "tag field" is used for the purposes of comparison.

When a request originates in a CPU for new information, the index field selects a set of cache memory. The tag field of every block in the selected set is compared to the tag field sought by the CPU. If the tag field of some block matches the tag field sought by the CPU, a "cache hit" occurs and information from the block is obtained directly from the high speed cache memory. If no match occurs, a "cache miss" occurs and the cache memory must be updated. Cache memory is updated by retrieving the desired block from main memory and then mapping this block into the set associative cache.

When a "cache miss" takes place, a block is first mapped with respect to a set, and then mapped with respect to a column. That is, the index field of a block retrieved from main memory specifies the set of cache memory wherein the block will be mapped. A "replacement scheme" is then relied upon to choose the particular block of the set that will be replaced. In other words, a replacement scheme determines the column where the block will be located. The object of a replacement scheme is to select for replacement the block of the set that is least likely to be needed in the near future so as to minimize further cache misses.

Replacement Schemes

Several factors contribute to the optimal utilization of cache memory in computer systems: cache memory hit ratio (probability of finding a requested item in cache), cache memory access time, delay incurred due to a cache memory miss, and time required to synchronize main memory with cache memory (store-through). In order to minimize delays incurred when a cache miss is encountered, as well as improve cache memory hit rates, an appropriate cache memory replacement scheme is needed.

Set associative cache memory replacement schemes may be divided into two basic categories: non-usage based and usage based. Non-usage based replacement schemes, which include first in, first out ("FIFO") and "random" replacement schemes, make replacement selections on some basis other than memory usage. Usage based schemes, which includes the least recently used ("LRU") replacement scheme, take into account the history of memory usage.

FIFO replacement schemes replace the block of a given set of cache memory which has been contained in the given set for the longest period of time. A FIFO replacement scheme may be implemented using a simple modulo N counter for each set, where N equals the number of columns or ways of the cache memory (i.e., the number of blocks contained in each set). The modulo N counter is incremented each time a block is replaced within a given set cache memory. The modulo N counter thus points to the next block of a given set of a cache memory that is selected for replacement.

A random replacement scheme is another non-usage based replacement scheme that can be implemented to randomly replace a block from a given set. One implementation of a random cache memory replacement scheme entails a single modulo N counter where N equals the number of columns or ways of the cache memory (i.e., the number of blocks contained in each set). The modulo N counter may be randomly incremented such that the counter randomly selects a block of a given set of cache memory for replacement.

Typically, usage based cache replacement schemes have been used in an attempt to select the least necessary block of a set for replacement when space is needed in a full cache memory. A popular replacement scheme for this purpose is the least recently used ("LRU") replacement scheme. According to the LRU replacement scheme, the least recently used block of information in cache memory is overwritten by the newest entry into cache memory. Theoretically, LRU replacement schemes typically yield a higher cache memory hit ratio than many FIFO or random replacement schemes. However, LRU replacement schemes have significant drawbacks. In particular, the implementation of a conventional LRU replacement scheme requires a separate data structure for each block to keep track of utilization chronology. Computations are carried out using such data structures for each block in order to determine the least recently used block of a given set. This results in a significantly larger cache. The increase in the size of a cache is, however, often not justified by smaller increases in the hit ratio.

An LRU replacement scheme assumes that the least recently used block of a given set is also the block that is least likely to be reused again in the immediate future. An LRU replacement scheme thus replaces the least recently used block of a given set with a new block of information that must be copied from main memory. An LRU replacement scheme is not, however, always optimal with respect to improving the probability of a cache hit. In some situations, an LRU replacement scheme may achieve an undesirable hit ratio of less than 50%, and in some cases fails catastrophically.

An LRU replacement scheme fails catastrophically when, as is often the case, a cache memory includes fewer columns than the number of blocks which sequentially contend for a given set. An LRU replacement scheme always replaces the least recently used block of information when a cache miss occurs. Unfortunately, in this instance, the least recently used block may be the block that will be required for processing in the near future. This results in a replacement cycle wherein necessary blocks are never in the given set because they were recently replaced by the LRU replacement scheme.

To further clarify the catastrophic failure scenario, assume there are five blocks numbered one, two, three, four and five. The five blocks are each specified to be placed in the same set of cache memory pursuant to the index field of their respective addresses. In this example, cache memory includes only four columns so that only four of the blocks may be contained in the set at any one time. The LRU replacement scheme will try to shuffle the five blocks in and out of the four columns. Assume that the blocks contain instruction sets that are executed cyclically and sequentially and that the set initially holds blocks one, two, three, and four. After executing the instruction set of block four, the CPU will request block five. LRU will attempt to put block five into cache memory. Because the set is full, LRU will select the least recently used block for replacement, to make room for block five. In this example, after executing block four, block one is the least recently used block. Thus, the LRU scheme replaces block one, the least recently used block, with block five. A cache miss will occur when requesting block five because block five was not in the set. Once the instruction set of block five is executed, block one is requested. Unfortunately, the LRU scheme replaced block one, and block one is not currently in the set. Thus, another cache memory miss is incurred for the block one request. Block one must therefore be replaced in the set from main memory. The least recently used block in cache memory is now block two, so the LRU replacement scheme replaces block two with block one. In this scenario, a cache memory hit will never be achieved because the LRU replacement scheme always selects the least recently used block for replacement, but that block is also the next required block. Thus, the LRU replacement scheme fails catastrophically and is detrimental in such a situation.

SUMMARY OF THE INVENTION

The present invention provides an improved method and apparatus for cache memory replacement which overcomes problems that have been encountered in the past. The present invention provides an improved method and apparatus for selecting blocks of information, including data and instructions, for replacement when a computer system must add information to a full set of cache memory. A weighted random replacement scheme, in accordance with the present invention, avoids catastrophic failures as discussed in the above example.

When a computer system encounters a series of blocks that cannot all be placed into a given set at any one time, a better solution than merely random replacement is to effectively "anchor" some of the blocks into the set of cache memory while allowing for other blocks to be continually replaced from the given set of cache memory. This avoids the above described catastrophic failure scenario where a block is replaced from cache memory and then sought for processing in the near future.

In accordance with a preferred embodiment of the present invention, a memory block is selected for replacement from a given set of cache memory based on the weighted random selection of a column of cache memory. One or more indices, having distinct values, are each assigned to one of the columns of cache memory. A random number, corresponding to one of the assigned index values, is generated by the present invention. The column of cache memory to which the corresponding index value is assigned is then determined by the present invention. The block of cache memory that is mapped to such determined column and given set is thus selected to be replaced from cache memory.

According to one aspect of the present invention, substantially all of the indices are assigned to one or more columns of cache memory. The blocks of a given set that are mapped to such columns will thus have a greater likelihood of replacement. The remaining columns of cache memory, to which substantially none of the indices are assigned, will thus be unlikely to be replaced. The blocks mapped to columns of cache memory, to which substantially none of the indices are assigned, can thus be said to be "anchored" within their respective sets.

For example, assume that a cache memory is organized into four columns, namely, columns A, B, C, and D. A given set of the cache memory can therefore only retain four memory blocks at any one time in columns A through D. When an item of information is needed from the given set but is not found in the four blocks currently mapped to the four columns, a cache miss occurs and one of the four blocks must be replaced with a block containing the needed item of information. Further assume that the present invention assigns ten indices, having values 1 through 10, to the four columns. In particular, indices having values 1 through 7 are assigned to column A, the indices having values 8, 9, and 10 are assigned to columns B, C and D, respectively. It follows that the probability of selection of columns A, B, C, and D are 70%, 10%, 10% and 10%, respectively. A random number is then generated between 1 and 10 so as to correspond to one of the assigned indices. For instance, if the generated random number is 4, then column A is selected and the block of the given set that is mapped to column A is replaced with a block containing the needed item of information.

According to another aspect of the present invention, no indices are assigned to one or more columns of cache memory. Any blocks mapped to those one or more columns will thus never be replaced and will preclude a catastrophic failure from occurring. In the above described example, where ten replacement indices are assigned to four columns of cache memory, indices having values through 4 could be assigned to column A, indices having values 5 through 7 could be assigned to column B, and indices having values 8 through 10 could be assigned to column C. Accordingly, since no indices are assigned to column D, all blocks already mapped to those columns are not replaced when a cache miss occurs.

According to another aspect of the present invention, a pseudorandom number is generated to correspond to one of the assigned indices.

These and other features will become apparent from a consideration of the following drawings, detailed description of a preferred embodiment of the invention, and claims.

DETAILED DESCRIPTION OF A PREFERRED EMBODIMENT OF THE INVENTION

The present invention will be further clarified by consideration of the following examples, which are intended to be representative of a preferred embodiment of the present invention and the use of the present invention without necessarily limiting the scope of the present invention. The present invention is an improved method and apparatus for determining the block of a cache memory set that is to be replaced:, when the set is full, with a block from main memory. Such is accomplished by the random selection of a weighted column of the set associative cache memory.

Computer System

Figure 1A:
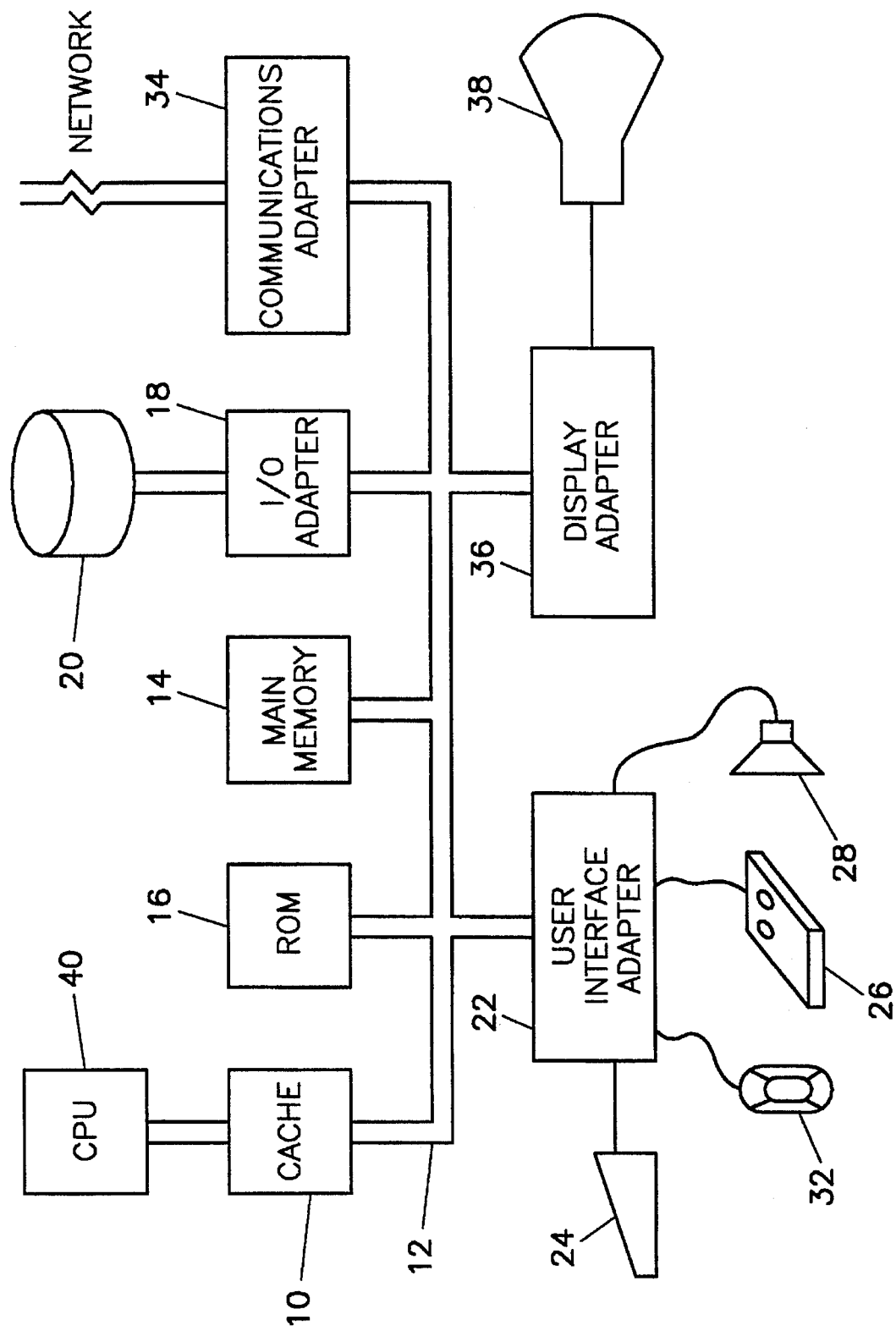
FIG. 1A illustrates a block diagram of a representative hardware configuration of a computer system, in accordance with a preferred embodiment of the present invention.

The invention is preferably practiced in the context of a computer system. Referring to FIG. 1A, a representative hardware configuration of a computer system is illustrated in accordance with a preferred embodiment of the present invention. A typical hardware configuration of a computer system includes a central processing unit ("CPU") 40, such as a conventional microprocessor which is connected to a cache memory 10. Cache memory 10 and CPU 40 are connected to a number of other components via a system bus 12. In particular, a main memory (commonly referred to as Random Access Memory—"RAM") 14 is connected to cache memory 10 and CPU 40 via system bus 12. Cache memory 10 and CPU 40 are also connected, via system bus 12, to: a Read Only Memory ("ROM") 16; an I/O adapter 18 that is further connected to peripheral devices, such as disk units 20; a user interface adapter 22 that is further connected to a keyboard 24, a mouse 26, a speaker 28, a microphone 32, and/or other user interface devices such as a touch screen device (not illustrated); a communications adapter 34 that is further connected to a data processing network; and, a display adapter 36 that is further connected to a display device 38.

Processor-Memory Environment

Figure 1B:
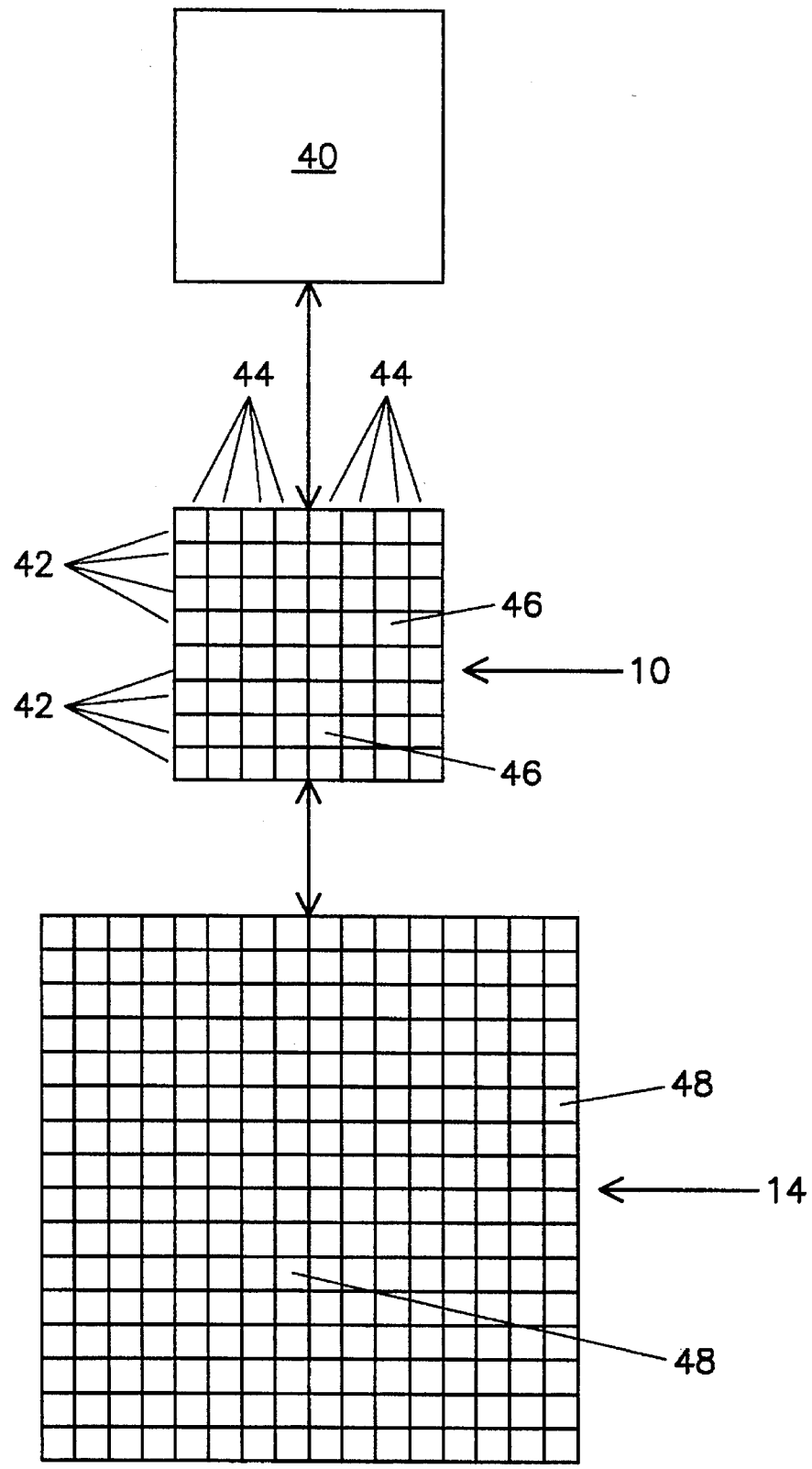
FIG. 1B illustrates a representative processor and memory environment wherein the present invention is employed, in accordance with a preferred embodiment of the present invention.

A representative processor-memory environment, in accordance with a preferred embodiment of the present invention, is illustrated in FIG. 1B. Referring to FIG. 1B, CPU 40 functions to process information, in the form of data and instructions, from main memory 14. Cache memory 10, which is interposed between CPU 40 and main memory 14, contains a collection of blocks as indicated generally by reference numeral 46. Each of blocks 46 contains several items of information, such as data and instructions.

Cache memory 10 follows a set associative organization. That is, cache memory 10 is divided into two or more sets. The sets of cache memory 10 are denoted by reference numeral 42. Blocks 46 are placed within a set 42 that is specified by the index field of the address of a given block 46. Cache memory 10 is further divided into a number of columns as denoted by reference numeral 44. Each block 46 of cache memory 10, is thus mapped to a set 42 of cache memory 10 as specified by the index field of the block address, as well as by a column 44 of cache memory 10.

Main memory 14 stores a collection of blocks 48. Blocks 48 of main memory 14 represent all items of the information, such as data and instructions, that are available in a computer system. Blocks 46 of cache memory 10 thus only represent a subset of blocks 48 of main memory 14. Therefore, cache memory 10 includes a relatively small subset of blocks 48. Preferably, cache memory 10 is faster than main memory 14. Thus, the access time for cache memory 10 is less than the access time for main memory 14. Cache memory 10 thus enables CPU 40 to rapidly access blocks 46, containing instructions, data, or other items of information, that would otherwise require access to slower main memory 14. Preferably, cache memory 10 speeds up program execution by providing a faster, although smaller, memory area.

A computer system may utilize cache memory 10 to rapidly access data, instructions, or other items of information requested by CPU 40. Preferably, whenever CPU 40 issues a request for data, instructions, or other items of information, the computer system checks to see if the requested item is already in one of the blocks 46 of high speed cache memory 10. The present invention improves overall performance of a computer system by enabling the computer system to encounter a cache memory hit more often, and thus rapidly fetch the requested information from cache memory 10 instead of having to access the slower main memory 14.

When the computer system finds that a requested item of information is not contained within a block 46 of a set 42 of cache memory 10, the computer system encounters a "cache miss." The overall response is slower when the computer system encounters a cache miss because the computer system must then access slower main memory 14 to retrieve the requested item of information from block 48 that contains other items of information, and place such a block 48 in its specified set 42 of cache memory 10. In order to place a block 48 from main memory 14 into cache memory 10, however, a column 44 of cache memory 10 must be selected. The set 42 specified by the address of the block 48 from main memory 14, along with the selected column 44, thus determines the block 46 of cache memory 10 that Will be replaced with the block 48 from main memory 14 (that contains the requested item of information).

Column Selection

In a preferred embodiment, the present invention preferably designates some of the columns 44 of cache memory 10 with a relatively low probability of selection. The remaining columns 44 of cache memory 10 are designated with a relatively high probability of selection. Blocks 46, that are mapped to columns 44 having a low probability of selection, are effective/ "anchored" into cache memory 10. In contrast, blocks 46 that are mapped to columns 44 having a high probability of selection, are frequently replaced from cache memory 10 when a cache memory miss occurs.

The present invention preferably designates columns 44 of cache memory 10 with differing probabilities of selection, or weights, through the assignment of replacement indices. Replacement indices are employed by the present invention to weight the probability that each column 44 will be selected. A set of replacement indices are available in a computer system. The present invention assigns some or all of the available replacement indices to the columns 44 of cache memory 10. In particular, the present invention assigns N replacement indices to the columns 44 of cache memory 10. Each of the N replacement indices preferably has a distinct integer value between 1 and N.

Each replacement index is assigned so as to point to a column 44 of cache memory 10. A pseudorandom number is generated by the present invention to correspond to one of the assigned replacement index values. The weight or probability that a replacement index will be selected is thus 1/N. Accordingly, the number of replacement indices that point to a given column 44 determines the probability that the given column 44 will correspond to the pseudorandom number. For instance, if 6 of 12 replacement indices are assigned to a given column 44, there is a 50% probability that the given column 44 will correspond to the pseudorandom number. A given column 44 can have no replacement indices assigned to it (0% probability that it will correspond to the generated random number) or all replacement indices assigned to it (100% probability that it will correspond to the generated random number).

The present invention is operable to provide one or more columns 44 with a low probability of selection while providing the remaining columns 44 with a high probability of selection. This is accomplished through the assignment of replacement indices. One or more replacement indices are assigned to those columns 44 that are desired to have a high probability of selection. Substantially none of the replacement indices, or no replacement indices, are assigned to those columns 44 that are desired to have a low probability of selection.

In a preferred embodiment, the present invention designates one of columns 44 with a high probability of selection. Preferably, at least one replacement index is assigned to each column 44 of cache memory 10. The remaining replacement indices are assigned to the column 44 that was selected to possess a high probability of selection. For example, where eight of ten available replacement indices are to be assigned among four columns 44 (columns A through D) of cache memory 10, the present invention preferably designates one of columns 44 with a high probability of selection. For instance, if column A is designated as such, the present invention initializes five out of the eight available indices to column A, and assigns a single index to column B, a single index to column C, and a single index to column D. In this example the weights for columns one through four are five, one, one, and one, respectively.

In an alternative embodiment, the present invention can assign all replacement indices to one column 44 of cache memory 10. Thus, in the above example, the weights of columns A through D can be assigned eight, zero, zero, and zero, respectively, to lock in blocks 46 that are mapped to columns B, C and D and always replace the blocks that are mapped to column A.

A number is arbitrarily generated by the present invention to correspond to one of the assigned replacement index values. The column 44 to which the selected replacement index value corresponds is thus selected. As a consequence, the block 46 that is mapped to the selected column 44 and its specified set 42 is replaced from cache memory 10.

Generation of Pseudorandom Number

Figure 2:
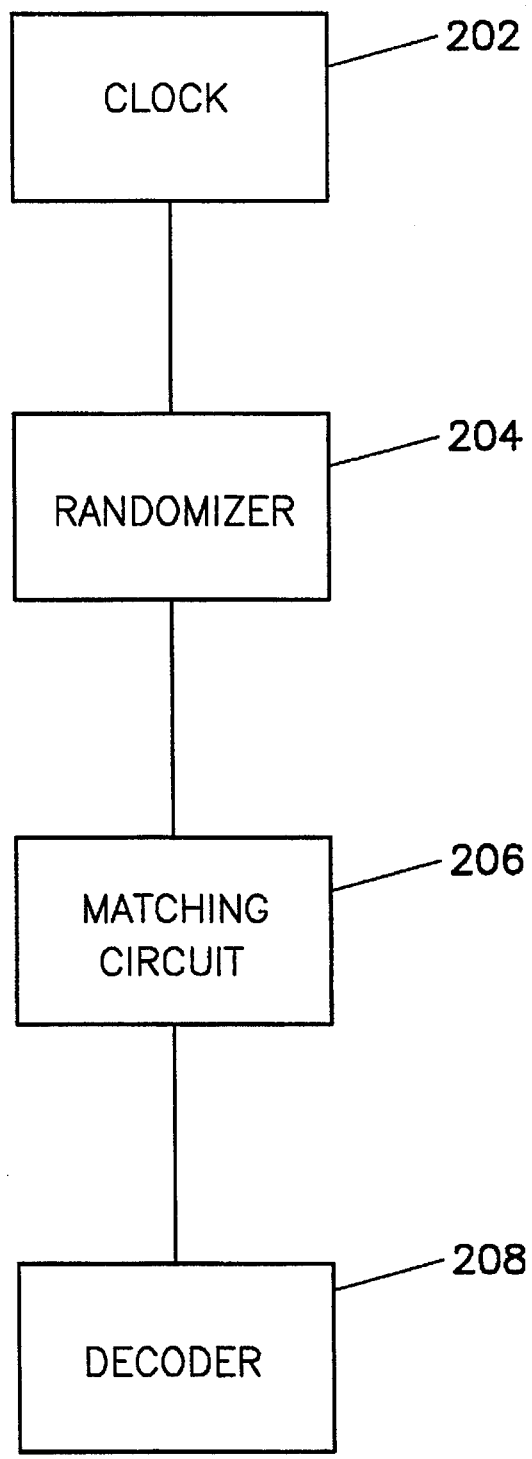
FIG. 2 illustrates a system block diagram of interconnected components for generating a pseudorandom number that selects a column of cache memory, in accordance with a preferred embodiment of the present invention.

Referring to FIG. 2, a system block diagram of interconnected components for generating a pseudorandom number that selects a column of cache memory, in accordance with a preferred embodiment of the present invention, is illustrated. In accordance with a preferred embodiment, the present invention employs a system clock as indicated by reference numeral 202. The present invention further employs a randomizer as indicated by reference numeral 204. Randomizer 204 is operable to provide an arbitrary number, preferably an integer that ranges from 1 to N, to correspond to one of the values of the assigned replacement indices. Randomizer 204 is sampled whenever a cache memory miss occurs.

Randomizer 204 may be either a random number generator or a pseudorandom sequence generator. A random number generator, as is well known to those skilled in the art of random number generation, may be employed as randomizer 204. Pseudorandom sequence generators, as are also well known in the art, include: (i) M-sequence generators, that consist of binary storage elements that form a shift register and modulo-2 adders which generate sequential values; (ii) pseudorandom number generators which generate sequences of uniformly distributed multidigit pseudorandom numbers; and (iii) composite number sequence generators, that combine both a pseudorandom number generator and a random number generator, to produce number sequences that preferably lack periodicity, as well as allow for the possibility of obtaining a zero pattern and the inconsistent recurrence of numbers.

Figure 3:
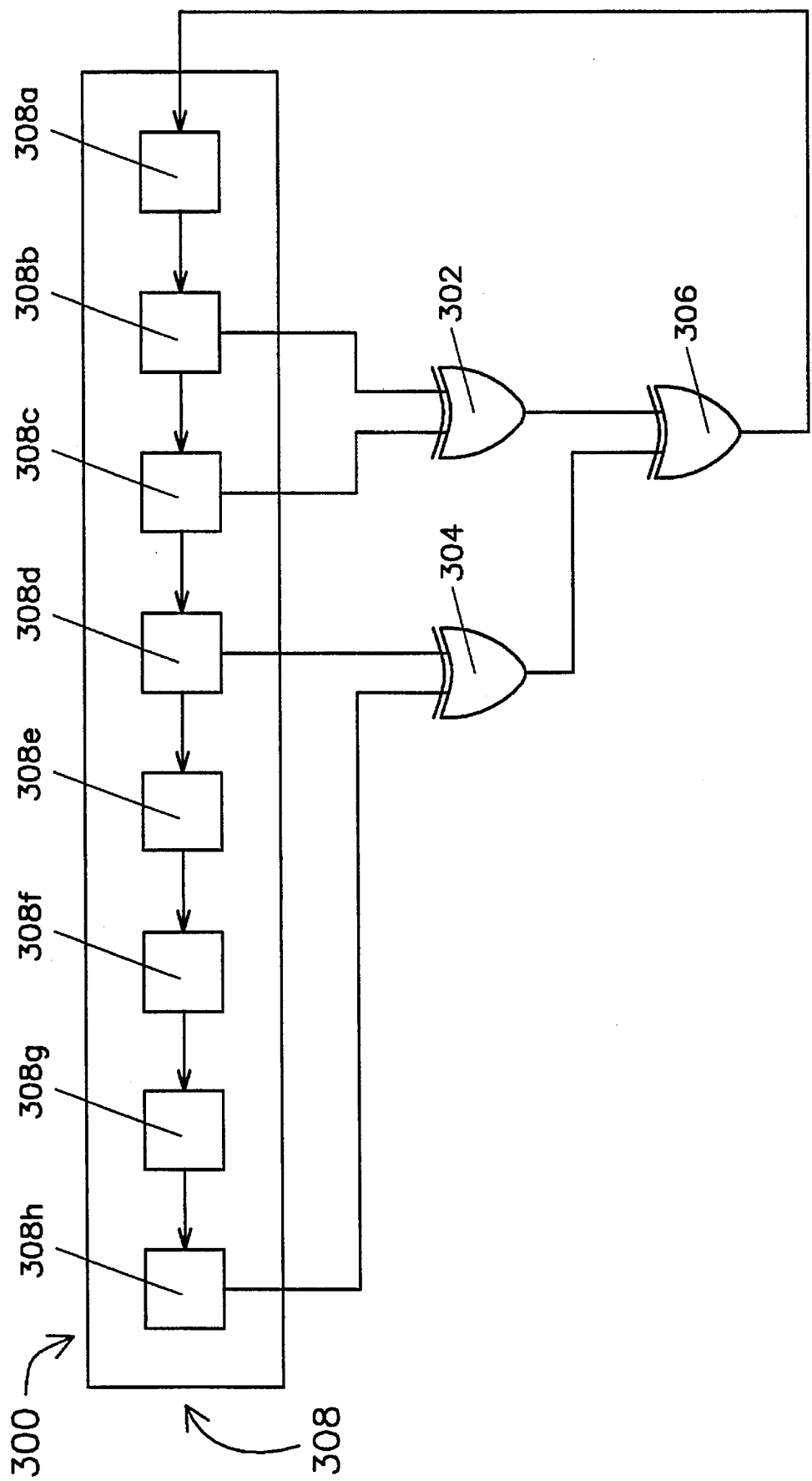
FIG. 3 illustrates a schematic diagram of a linear sequential machine which is utilized to generate a pseudorandom number, in accordance with a preferred embodiment of the present invention.

Preferably, randomizer 204 is a pseudorandom number generator, namely, a linear sequential machine. Referring to FIG. 3, a linear sequential machine, in accordance with a preferred embodiment of the present invention, is illustrated. Linear sequential machine 300 includes shift registers as indicated by reference numeral 308. Preferably, the binary value of 10001110 is initially loaded into shift registers 308. Shift registers 308 of FIG. 3 retain eight bits which are indicated by reference numeral 308a–h, where 308h is the most significant bit and 308a is the least significant bit. Preferably, bits 308b and bit 308c, the second and third least significant bits of register 308, are preferably connected to the inputs of exclusive OR gate ("XOR-gate") 302. Similarly, bits 308d and bit 308h, the fourth least significant bit and the most significant bit of register 308, respectively, are preferably connected to the inputs of XOR-gate 304. The respective outputs of XOR-gates 302 and 304 are connected to the inputs of a third XOR-gate 306. The output of XOR-gate 306 is then shifted into shift registers 308 as bit 308a, the least significant bit. XOR-gates 302–306 are thus operable to alter the counting sequence of shift register 308 so that a pseudorandom number sequence is continually generated.

Alternatively, randomizer 204 may be a modulo N counter that is incremented synchronously on every clock cycle of system clock 202 so that it counts sequentially and cyclically from 1 to N. If a modulo N counter is employed as randomizer 204, the sampled lo value of randomizer 204 will appear to be arbitrary only when cache memory misses do not periodically occur so as to be synchronous with system clock 202. In other words, if there is a correlation between the times when columns are selected and the clock cycle of system clock 202, the sampled value of a counter will not appear to be arbitrary.

Referring back to FIG. 2, randomizer 204 preferably generates a pseudorandom number ranging from 1 to N. N is equivalent to the number of replacement indices assigned out of the total number of indices provided in the set of replacement indices. The generated pseudorandom number, ranging from 1–N, corresponds to one of the assigned N replacement index values. The pseudorandom number generated by randomizer 204 is then passed on to a matching circuit as indicated by reference 206. Matching circuit 206 determines the column 44 to which the replacement index, having a value that matches the generated pseudorandom number, is assigned. The column 44, that is determined to have the matching replacement index value assigned to it, is thus selected. Matching circuit 206 passes a binary number indicating the selected column 44 to decoder circuit 208. Decoder circuit 208 includes outputs which correspond to each of the columns 44 of cache memory 10. Decoder circuit 208 is thus operable to decode the binary number generated by matching circuit 206 such that the output corresponding to the selected column 44 is selected.

Selection of Block of Cache Memory To Be Replaced

Figure 4:
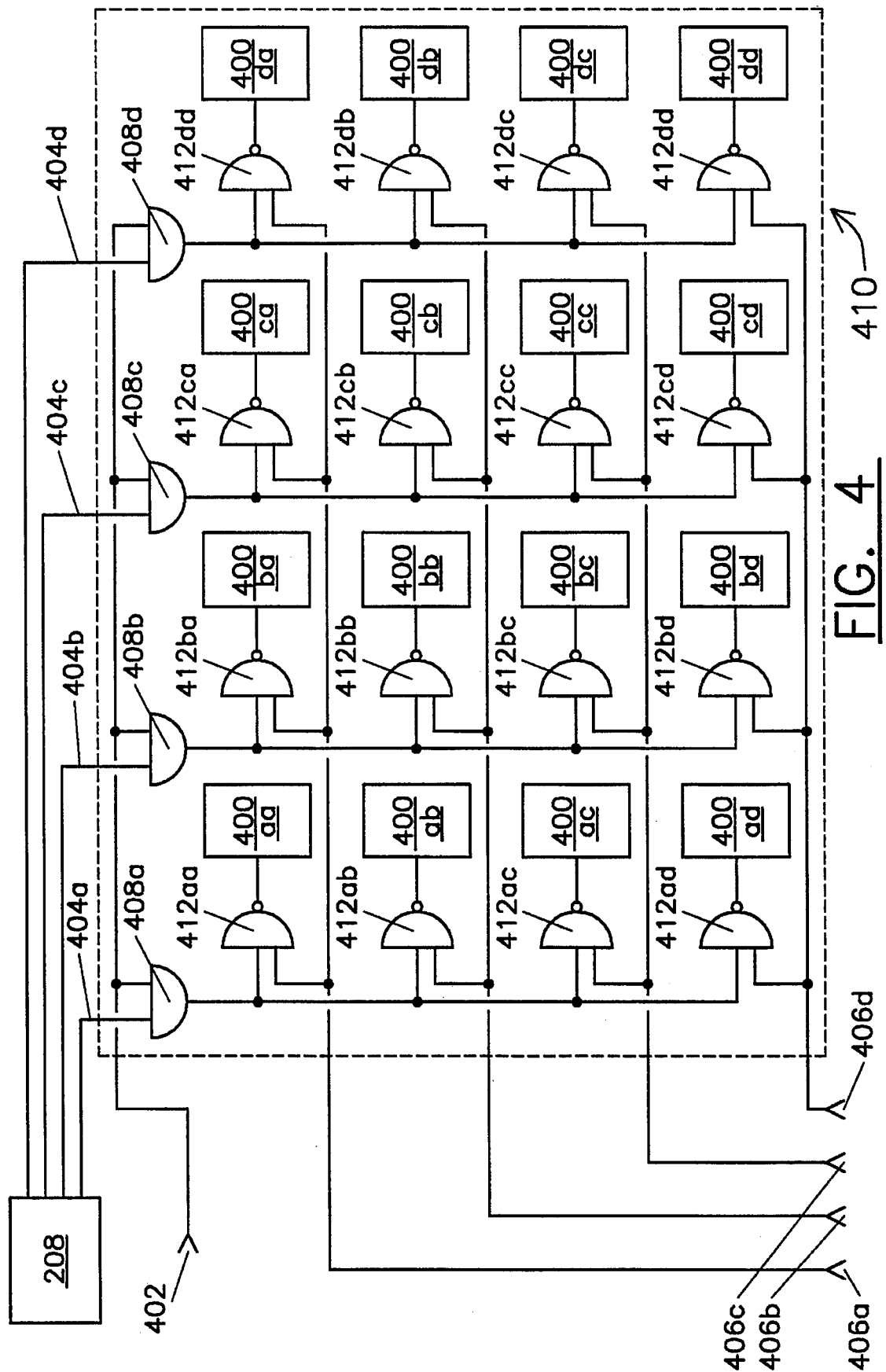
FIG. 4 illustrates a schematic logic diagram of a circuit selecting a block of cache memory for replacement, in accordance with a preferred embodiment of the present invention.

Referring to FIG. 4, a schematic logic diagram of a circuit for selecting a block of cache memory to be replaced, in accordance with the present invention, is illustrated. A selection circuit, as indicated generally by reference numeral 410, is operable to select the specific block that is to be replaced in cache memory. Sixteen blocks of cache memory, as indicated by reference numerals 400aa–dd, are illustrated in FIG. 4. Blocks 400aa–dd of cache memory are organized into four columns as follows: block 400aa, block 400ab, block 400ac, and block 400ad form "column A"; block 400ba, block 400bb, block 400bc, and block 400bd form "column B"; block 400ca, block 400cb, block 400cc, and block 400cd form "column C"; and, block 400da, block 400db, block 400dc, and block 400dd form "column D". Blocks 400aa–dd can similarly be separated in sets A through D. The present invention may, however, be practiced with a cache memory of any size or organization.

Signals from outputs 404a–d of decoder circuit 208, as well as input signals 406a–d, are supplied to selection circuit 410. Outputs 404a–d provide selection circuit 410 with signals that are indicative of the column of cache memory from which one of blocks 400a–dd is to be replaced. Similarly, input signals 406a–d are indicative of the set of cache memory from which one of the blocks 400aa–dd is to be replaced. Input signals 406a–d are thus determined by the index field of the address of the block from main memory which is to overwrite the block of cache memory that is selected for replacement.

Selection circuit 410 includes NAND-gates 412aa–dd and AND-gates 408a–d. Blocks 400aa–dd are each coupled to respective NAND-gates 412aa–dd. In order to overwrite one of blocks 400aa–dd, a low signal is delivered to one of blocks 400aa–dd through the output of its respective NAND-gate 412aa–dd.

Each of outputs 404a–d corresponds to one of columns 44 of cache memory 12. Decoder circuit 208 is operable to convert the binary number that is generated by matching circuit 206 to select only one of outputs 404a–d. Accordingly, only one of outputs 404a–d is a high signal; the others are all low signals. Outputs 404a–d are connected to selection circuit 410. Specifically, outputs 404a–d are connected to the inputs of AND-gates 408a–d along with a "write cache" signal input, as indicated by reference numeral 402.

Write cache signal 402 is only high when a cache miss occurs and a block from cache memory must be replaced. Accordingly, AND-gates 408a–d output only one output high signal, corresponding to the selected column, when a cache miss occurs.

The output signals of AND-gates 408a–d (only one of which is high) connect to the inputs of NAND-gates 412aa–dd. In particular, the outputs of AND-gates 408a–d are connected as follows: the output of AND-gate 408a is connected to the inputs of NAND-gates 412aa, 412ab, 412ac, and 412ad; the output of AND-gate 408b is connected to the inputs of NAND-gates 412ba, 412bb, 412bc, and 412bd; the output of AND-gate 408c is connected to the inputs of NAND-gates 412ca, 412cb, 412cc, and 412cd; and, the output of AND-gate 408d is connected to the inputs of NAND-gates 412da, 412db, 412dc, and 412dd.

Input signals 406a–d are also connected to NAND-gates 412aa–dd. Input signals 406a–d indicate the set wherein one of blocks 400aa–dd of cache memory must be replaced (as specified by the index field of the needed block from main memory). Accordingly, only one of input signals 406a–d is high; the others are low. Input signals 406a–d are connected as follows: input signal 406a is connected to the inputs of NAND-gates 412aa, 412ba, 412ca, and 412da; input signal 406b is connected to the inputs of NAND-gates 412ab, 412bb, 412cb, and 412db; input signal 406c is connected to the inputs of NAND-gates 412ac, 412bc, 412cc, and 412dc; and, input signal 406d is connected to the inputs of NAND-gates 412ad, 412bd, 412cd, and 412dd.

The one NAND-gate of NAND-gates 412aa–dd that receives a high signal from one of AND-gates 408a–d, as well as a high signal from one of input signals 406a–d, will output a low signal. That low signal will thus select the block that is to be overwritten. For instance, if output 404d of decoder circuit 208 is a high signal (column D has been selected), when write cache signal 402 is high, the output of AND-gate 408d will also be high. That resulting high signal will be connected to NAND-gates 412da–dd. If input signal 406b is also high (set B is specified by the replacement block from main memory), the output of NAND-gate 412db will be a low signal. Thus, block 400db will be selected for replacement and overwritten with a block of information from main memory.

The system and method of the present invention, therefore, is well adapted to carry out the objects and attain the ends and advantages mentioned, as well as others inherent therein. While a presently preferred embodiment of the invention has been given for purposes of disclosure, numerous changes in the details of construction, interconnection and arrangement of parts will readily suggest themselves to those skilled in the art, and which are encompassed within the spirit of the invention and the scope of the appended claims.

What is claimed is:

1. In a set associative cache memory having memory blocks of information that are organized into sets and columns, an apparatus for selecting a column of cache memory for replacement of the memory block information contained therein, said apparatus comprising:

(a) a plurality of columns having a plurality of indices; assigned to each one of the plurality of columns;

(b) a means for generating a random number that corresponds to a particular one of the plurality of indices; and (c) a circuit for determining the one of the plurality of columns of cache memory to which the particular one of the plurality of indices is assigned.

2. The apparatus as recited in claim 1, wherein a greater number of the plurality of indices are assigned to at least one of the columns of the cache memory such that the at least one of the columns has a greater likelihood of being selected.

3. The apparatus as recited in claim 1, wherein a fewer number of the plurality of indices are assigned to at least one of the columns of the cache memory such that the at least one of the columns has less likelihood of being selected.

4. The apparatus as recited in claim 1, wherein the random numbers are generated asynchronously with respect to the replacement of information in the memory block.

5. The apparatus as recited in claim 1, wherein the means for generating a random number is a digital logic circuit for generating a pseudorandom number.

6. The apparatus as recited in claim 5, wherein the digital logic circuit for generating a pseudorandom number is a linear sequential machine.

7. The apparatus as recited in claim 1, wherein the means for generating a random number is a digital logic counter.

8. In a set associative cache memory having memory blocks of information that are organized into sets and columns, an apparatus for selecting a column of cache memory for replacement of the memory block information contained therein, said apparatus comprising:

(a) a plurality of columns having a plurality of indices assigned to each one of the plurality of columns;

(b) a pseudorandom number generator that generates a pseudorandom number that corresponds to a particular one of the plurality of indices;

(c) a matching circuit for determining the one of the plurality of columns of cache memory to which the particular one of the plurality of indices is assigned; and (d) a selection circuit, connected to said matching circuit, said selection circuit selecting the one of the plurality of columns of cache memory having the particular one of the plurality of indices assigned thereto.

9. The apparatus as recited in claim 8, wherein the selection circuit allows new information to be written to the memory blocks contained in the selected one of the plurality of columns of cache memory.

10. In a set associative cache memory having memory blocks of information that are organized into sets and columns, a method for selecting a column of cache memory for replacement of the memory block information contained therein, said method comprising the steps of:

(a) assigning a plurality of indices to the columns, wherein a greater number of the plurality of indices are assigned to at least one of the columns such that the at least one of the columns has a greater likelihood of being selected;

(b) randomly selecting one of the plurality of indices; and (c) replacing the memory blocks contained in the column assigned the selected one of the plurality of indices.

11. The method as recited in claim 10, wherein the one of the plurality of indices is randomly selected by generating a random number that corresponds to one of the plurality of indices.

12. In a set associative cache memory having memory blocks of information that are organized into sets and columns, a method for selecting a column of cache memory for replacement of the memory block information contained therein, said method comprising the steps of:

(a) assigning a plurality of indices to the columns, wherein a fewer number of the plurality of indices are assigned to at least one of the columns such that the at least one of the columns has less likelihood of being selected;

(b) randomly selecting one of the plurality of indices; and (c) replacing the memory blocks contained in the column assigned the selected one of the plurality of indices.

13. The method as recited in claim 12, wherein the one of the plurality of indices is randomly selected by generating a random number that corresponds to one of the plurality of indices.

* * * * *